United States Patent Office 3,276,840
Patented Oct. 4, 1966

3,276,840
METHODS FOR PROMOTING THE GERMINATION OF BACTERIAL SPORES EMPLOYING A PROTEOLYTIC ENZYME
Gonzalo Sierra, Cooksville, Ontario, Canada, assignor to Ontario Research Foundation, Toronto, Ontario, Canada
No Drawing. Filed May 11, 1964, Ser. No. 366,658
19 Claims. (Cl. 21—2)

This invention relates to methods for promoting the germination of bacterial spores. More particularly, this invention relates to methods for promoting fast germination of Bacillus or Clostridium spores so as to make the spores more sensitive to destruction by heat or ionizing radiation.

It is known that germinated Bacillus and Clostridium spores can be destroyed considerably more readily by heat or ionizing radiation, such as gamma radiation or high energy electrons, for example, than can ungerminated Bacillus and Clostridium spores. Bacillus and Clostridium spores are commonly found in raw foods of all types, and bacterial which evolve from these spores are instrumental in the destruction of foods by spoilage and, in some cases, actually poison the foods (e.g. Cl. botulinum).

Because Bacillus and Clostridium spores are difficult to destroy with dosages of ionizing radiation or amounts of heat which do not affect the organoleptic quality of foods, a method is required for making bacterial spores more sensitive to destruction by heat or ionizing radiation, so that the spores can be destroyed with minimal changes in the organoleptic quality of raw foods in which the spores are found.

In accordance with this invention it has been discovered that enzymes can be obtained which are of such a nature that they act directly on the intact spore envelope of ungerminated bacterial spores to induce fast germination thereof without any preliminary treatment of the spore coat to break down disulphide bonds. As aforementioned, once the spores have germinated, they are more susceptible to being destroyed by amounts of heat or a dosage of ionizing radiation which is less than that which would be required if the spores had not germinated.

Aside from the spoilage or poisoning of foodstuffs such as fruits, vegetables, meats and fish caused by bacteria from the Bacillus and Clostridium genera, members from the Bacillus genera have been known to cause other undesirable effects, such as, for example, the formation of "slime" in high octane hydrocarbon fuels, which may lead to the malfunctioning of internal combustion or jet engines, and subsequently to the destruction of an aircraft using a hydrocarbon fuel in which such "slime" has formed. In accordance with this invention, Bacillus spores found in hydrocarbon fuels can be controlled more readily than has hitherto been possible.

Accordingly, it is an object of this invention to provide a process for promoting the germination of Bacillus and Clostridium spores so as to make the spores more sensitive to destruction by heat or ionizing radiation.

In accordance with this invention it has been discovered that a proteolytic enzyme extracted from bacterial spores of the Bacillus or Clostridium genera, such as B. subtilis, for example, can be used directly to induce fast germination of bacterial spores of the Bacillus and Clostridium genera, such as B. subtilis, B. cereus, and B. licheniformis, for example.

The proteolytic enzyme employed to induce germination may be extracted from the spores in a number of ways. It has been found, however, that the best method for extracting the enzyme is to employ a Nossal disintegrator and to centrifuge the slurry obtained from the Nossal disintegrator. As exemplary only of one suitable method for obtaining the proteolytic enzyme, a suspension of clean, lyophilized B. subtilis spores (225 mg. per 9 ml. physiological saline) was placed in the 18-ml. capsule of a Nossal disintegrator (equipped with a liquid carbon dioxide jet cooling assembly) with 3.94 g. of acid-washed glass beads (100–140$\mu$ diameter). The shaker was operated for 30-second periods at intervals of 2 minutes, starting with cooling jet and shaker together, the jet being operated alternately—five seconds on and five off—during the shaking period. This treatment kept the temperature of the slurry between 0° and 4° C. during 6-minute cumulative 30-second shaking periods. Spore fragmentation was followed by removal of the samples after Nossal treatment and observation of them with the electron microscope. Release of constituents was determined by centrifuging the samples at 17,000×$g$ for 70 minutes, a time which sediments residual spores and fragments of microscopic dimensions. Release was judged by failure to sediment in this centrifugation. A cell-free extract from clean spores of Bacillus subtilis was obtained by decanting the upper fraction of the centrifuged sample. This extract was dialysed overnight at a temperature of 0° C. to provide a purified extract which was demonstrated to contain a proteolytic enzyme by virtue of the fact that the extract digested casein (1%) in an aqueous solution maintained at 37° C. and having a pH of 8.0.

This proteolytic enzyme appears to be subtilisin, which is a commercially available crystalline proteolytic enzyme from B. subtilis (vegetative form). It behaves the same as subtilisin to inhibition by inhibitors and optimum pH.

When ungerminated bacterial spores were contacted with subtilisin in the manner outlined in detail hereinafter, it was found that germination of the spores proceeded rapidly.

The spores to be germinated were present in a buffer solution (containing phosphate, for example) having a pH of between 8.0 and 9.0 and maintained at a temperature of between 35° C. and 40° C. during germination. While a pH between 8 and 9 is preferred for maximum germination, solutions having lower pH's, down to 7, for example, or higher pH's, to 9.5, for example, might be employed, although maximum germination would not be expected at these values. Similarly, solution temperatures below 35° C., down to 20° C., for example, or temperatures up to 45° C. might be employed, but with lower temperatures, the activity of the proteolytic enzyme decreases, and care must be taken with higher temperatures, because the proteolytic enzyme may be destroyed.

It has been found that the proteolytic enzyme concentration in the buffered solution of spores to be germinated affects the rate of germination. A maximum rate was found for a proteolytic enzyme concentration of 8 mg./ml. At lower concentrations such as 6 mg./ml., for example, germination also takes place, but at a slower rate, and it has been found that the rate of spore germination does not increase rapidly with protelytic enzyme concentrations above about 9 mg./ml.

The length of time that the proteolytic enzyme is in contact with the spores to be germinated is a factor which affects the degree of germination. As may be seen from the following examples, when an extract from Bacillus subtilis was used with several different types of ungerminated Bacillus spores, a high percentage of germination was obtained after 160 minutes. With other types of spores longer or shorter times may be expected to produce the same percentage of germination.

The following examples are intended to illustrate the method:

*Example I*

2 ml. of a buffered solution (phosphate buffer) having a pH of 8.0 and containing spores of a strain of Bacillus

*subtilis* was prepared. To this was added 1 ml. of the previously prepared protelytic enzyme solution. The resultant solution was maintained at a temperature of 37° C. for 160 minutes.

Germination of the *Bacillus subtilis* spores was measured by observing the change in optical density of the suspension employing a wavelength of 660 mµ by phase contrast and electron microscopy. Readings were taken at 10-minute intervals, and it was determined that a very high percentage of the spores had germinated after treatment for 160 minutes. The concentration of the proteolytic enzyme in the solution was 8 mg./ml.

It was demonstrated that germination was due to proteolytic activity by virtue of the fact that enzymatic germination of *B. subtilis* spores was completely inhibited by $2.0 \times 10^{-3}$ M diisopropyl-phosphorfluoridate, which is a potent inhibitor of proteinase.

*Example II*

Example I was repeated using as the spores to be germinated a different strain of *Bacillus subtilis,* and prompt germination of these spores was observed.

*Example III*

Example I was repeated using two different strains of *Bacillus cereus* spores to be germinated, and prompt germination thereof was observed.

*Example IV*

Example I was repeated using a strain of *Bacillus licheniformis* spores to be germinated, and prompt germination thereof was observed.

It was found that while ungerminated spores of *B. subtilis* are resistant to 85° C. for 15 minutes, 96% of the spores were destroyed after enzymatic treatment (conditions in accordance with Example I) when heated at 85° C. for 15 minutes. Normally, where an attempt is being made to destroy ungerminated spores, temperatures of 120° C. and times of the order of 20 minutes are employed. It will be appreciated, of course, that some types of germinated Bacillus and Clostridium spores are more resistant to heat than others. Accordingly, it may require longer times and/or higher temperatures to destroy other types of germinated Bacillus or Clostridium spores, but the amount of heat required to destroy the germinated form of the spores will be less than the amount of heat required to destroy the ungerminated form of the corresponding spores.

Destruction of the germinated spores also may be accomplished using conventional methods involving the use of ionizing radiation. Since these methods are well known in the art, it is not necessary to elaborate on the details thereof except to note that smaller radiation does are required to destroy a germinated Bacillus or Clostridium spore than to destroy the corresponding ungerminated spore.

While preferred embodiments of this invention have been discussed in detail herein, those skilled in the art will appreciate that changes and modifications may be made therein without departing from the spirit and scope of this invention as defined in the appended claims.

What I claim as my invention is:

1. A method for promoting the germination of spores of bacteria selected from the class consisting of Bacillus and Clostridium which comprises contacting said spores with a proteolytic enzyme extracted from spores of bacteria selected from the class consisting of Bacillus and Clostridium.

2. A method according to claim 1 wherein said spores to be germinated are contacted with said proteolytic enzyme in a solution containing said proteolytic enzyme and having a temperature from between 35–40° C.

3. A method according to claim 1 wherein said spores to be germinated are contacted with said proteolytic enzyme in a solution containing said proteolytic enzyme and having a pH of between 8.0 and 9.0.

4. A method according to claim 1 wherein said spores to be germinated are contacted with said proteolytic enzyme in a solution containing about 8 mg./ml. of said proteolytic enzyme.

5. A method according to claim 1 wherein said spores to be germinated are contacted with said proteolytic enzyme in a solution containing said proteolytic enzyme and having a temperature from between 35–40° C., said solution having a pH between 8.0 and 9.0, and the concentration of said proteolytic enzyme in said solution being about 8 mg./ml.

6. A method for promoting the germination of spores of bacteria selected from the class consisting of Bacillus and Clostridium which comprises contacting said spores with subtilisin.

7. A method of promoting the germination of spores of bacteria selected from the class consisting of Bacillus and Clostridium which comprises contacting said spores with subtilisin in a solution and having a temperature from between 35–40° C., said solution having a pH between 8.0 and 9.0, and the concentration of subtilisin in said solution being about 8 mg./ml.

8. A method for promoting the germination of spores of bacteria selected from the class consisting of *Bacillus subtilis, Bacillus cereus* and *Bacillus licheniformis* which comprises contacting said spores with a proteolytic enzyme extracted from *Bacillus subtilis* spores.

9. A method according to claim 8 wherein said spores to be germinated are contacted with said proteolytic enzyme in a solution containing said proteolytic enzyme and having a temperature from between 35–40° C.

10. A method according to claim 8 wherein said spores to be germinated are contacted with said proteolytic enzyme in a solution containing said proteolytic enzyme and having a pH of between 8.0 and 9.0.

11. A method according to claim 8 wherein said spores to be germinated are contacted with said proteolytic enzyme in a solution containing about 8 mg./ml. of said proteolytic enzyme.

12. A method according to claim 8 wherein said spores to be germinated are contacted with said proteolytic enzyme in a solution containing said proteolytic enzyme and having a temperature from between 35–40° C., said solution having a pH between 8.0 and 9.0, and the concentration of said proteolytic enzyme in said solution being about 8 mg./ml.

13. A method according to claim 8 wherein said proteolytic enzyme is subtilisin.

14. A method for destroying spores of bacteria selected from the class consisting of *Bacillus* and *Clostridium* which comprises germinating said spores by contacting said spores with a proteolytic enzyme extracted from spores of bacteria selected from the class consisting of *Bacillus* and *Clostridium*, and thereafter subjecting the germinated spores to a dose of ionizing radiation sufficient to kill the germinated spores.

15. A method for destroying spores of bacteria selected from the class consisting of *Bacillus* and *Clostridium* which comprises germinating said spores by contacting said spores with a proteolytic enzyme extracted from spores of bacteria selected from the class consisting of *Bacillus* and *Clostridum*, and thereafter heating the germinated spores to a temperature and for a time sufficient to kill the germinated spores.

16. A method for destroying spores of bacteria selected from the class consisting of *Bacillus* and *Clostridium* which comprises germinating said spores by contacting said spores with a proteolytic enzyme extracted from spores of bacteria selected from the class consisting of *Bacillus* and *Clostridum* in a solution having a temperature between 35 and 40° C., a pH between 8.0 and 9.0 and containing about 8 mg./ml. of said proteolytic enzyme, and thereafter subjecting the germinated spores to a dose of ionizing radiation sufficient to kill the germinated spores.

17. A method for destroying spores of bacteria selected from the class consisting of *Bacillus* and *Clostridium* which comprises germinating said spores by contacting said spores with a proteolytic enzyme extracted from spores of bacteria selected from the class consisting of *Bacillus* and *Clostridium* in a solution having a temperature between 35 and 40° C., a pH between 8.0 and 9.0 and containing about 8 mg./ml. of said proteolytic enzyme, and thereafter heating the germinated spores to a temperature and for a time sufficient to kill the germinated spores.

18. A method for destroying spores of bacteria selected from the class consisting of *Bacillus subtilis, Bacillus cereus* and *Bacillus licheniformis* which comprises germinating said spores by contacting said spores with a proteolytic enzyme extracted from *Bacillus subtilis* spores in a solution having a temperature between 35 and 40° C., a pH between 8.0 and 9.0 and containing about 8 mg./ml. of said proteolytic enzyme, and thereafter heating the germinated spores to a temperature and for a time sufficient to kill the germinated spores.

19. A method for destroying spores of bacteria selected from the class consisting of *Bacillus subtilis, Bacillus cereus* and *Bascillus licheniformis* which comprises germinating said spores by contacting said spores with a proteolytic enzyme extracted from *Bacillus subtilis* spores in a solution having a temperature between 35 and 40° C., a pH between 8.0 and 9.0 and containing about 8 mg./ml. of said proteolytic enzyme, and thereafter heating the germinated spores to a temperature and for a time sufficient to kill the germinated spores.

No references cited.

JULIAN S. LEVITT, *Primary Examiner.*

MARTIN J. COHEN, *Assistant Examiner.*